April 23, 1957 G. A. BRACE 2,789,798
FOLDING FOOD MIXERS
Filed Dec. 30, 1952 3 Sheets-Sheet 1

INVENTOR.
George A. Brace
BY *Richard R. Fitzsimmons*
ATTORNEY.

April 23, 1957  G. A. BRACE  2,789,798
FOLDING FOOD MIXERS
Filed Dec. 30, 1952  3 Sheets-Sheet 2

INVENTOR.
George A. Brace
BY
ATTORNEY.

INVENTOR.
George A. Brace
ATTORNEY.

United States Patent Office 2,789,798
Patented Apr. 23, 1957

2,789,798

FOLDING FOOD MIXERS

George A. Brace, Highland Park, Ill., assignor to The Hoover Company, North Canton, Ohio, a corporation of Ohio Application December 30, 1952, Serial No. 328,754

30 Claims. (Cl. 259—108)

This invention relates to food mixers and more particularly to a novel construction arranged to fold into a compact package requiring a minimum of storage space and which is quickly and easily extendable to its normal operating position.

Prior food mixer constructions present a storage problem due to the excessive space occupied by the driving motor, its supporting standard and the base. Numerous attempts have been made to cope with this problem by building the mixer into kitchen cabinets or by providing complex and costly modes of folding the major components into a more compact form for storage purposes.

For example, the recent patent to Nelson, Patent No. 2,599,275 discloses a food mixer in which a light duty motor has a compound swivelling and pivoting connection with a folding supporting standard. When collapsed the mixer is covered by inverting the mixing bowl thereover. Nelson's construction has numerous disadvantages which are overcome by the construction disclosed in this specification. For example, the overturned mixing bowl rests loosely on top of the base making it difficult and hazardous to attempt moving the mixer. Furthermore, Nelson's construction precludes the use of a carrying handle for the motor because an excessively deep mixing bowl would be required to enclose the collapsed appliance. And obviously the swivelling coupling between the motor and supporting standard is inconvenient and unsuitable for supporting a heavy duty motor and absorbing the strains imposed thereon by many household mixing tasks. The same or similar deficiencies are characteristic of the prior art generally.

The present invention provides a simple yet rugged design not subject to the many objectional features of prior mixers. Among other things, the invention features an easily and rapidly folding construction making use of a novel quickly detachable connection between the power unit and the supporting standard. If the user wishes to use the motor apart from the standard and base, she uncouples the motor by a simple lifting manipulation applied through the carrying handle.

Another feature is a unique mode of folding and locking the motor and standard against the base so that the motor carrying handle serves as a transporting handle for the compactly folded appliance.

Accordingly, it is a prime object of the invention to provide a new food mixer construction which folds readily into a compact unit for storage occupying only slightly more space than the driving motor and its handle.

Another object is the provision of a folding food mixer having a carrying handle for the driving motor which also serves as the carrying handle for the entire appliance when folded in storage position.

Yet another object is the provision of a collapsing mixer which may be enclosed by the supporting standard for the motor or by a separate casing and locked in collapsed position by a single conveniently operable latch.

A further object is the provision of a novel coupling between the driving motor and supporting standard which is easily adjustable to different positions or readily disconnectable so that the motor and beaters may be used apart from the base and standard.

Another object is the provision of a folding turntable for the mixing bowl and a built-in storage facility for the service cord.

Numerous other advantages and features of the invention will become apparent from the following detailed specification of illustrative embodiments taken in connection with the accompanying drawings, in which.

Figure 1:
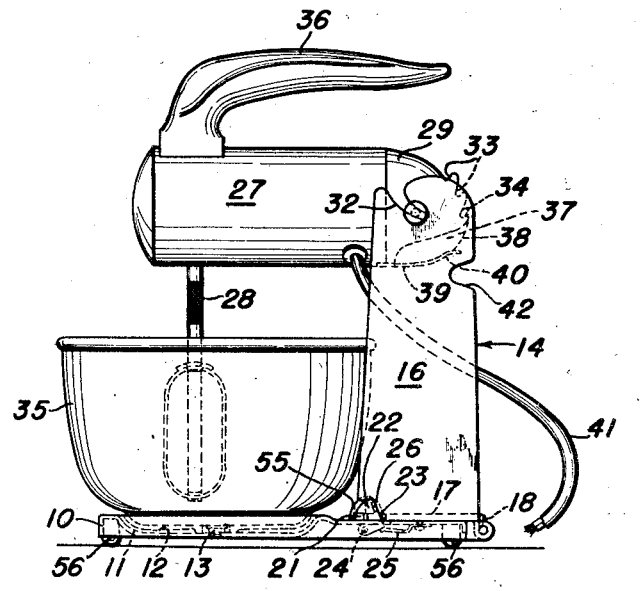
Figure 1 is a side view of a food mixer incorporating the invention and with the parts extended to their normal operating position.

The embodiment shown in Figures 1 to 4 comprises a stamped sheet metal base 10 of generally rectangular shape formed with a circular depression 11 near its forward end within which a turntable 12 is rotatably supported by a pin and bearing assembly 13.

The supporting standard or pedestal for the power unit generally designated 14 comprises a U-shaped member formed from heavy sheet metal having legs 15 and 16 generally parallel to one another interconnected at their lower ends by a flat base 17. Tabs 18, 18 integral with the rear end corners of base 17 encircle a hinge pin 19 carried in another tab 20 integral with the rear edge of the mixer base. It will therefore be clear that tabs 18 and 20 together with pin 19 form a hinge connection between standard 14 and base 10. The axis of this hinge is so positioned that pedestal base 17 rests flush against the upper surface of base 10 when the mixer is in its operating position and so that the rear edge of the pedestal can lie flush across the underside of base 10 when the mixer is folded for storage.

Although it is not essential, it is preferable to lock the standard in its operating position. As here shown, this may be done by striking a tab 21 outwardly from leg 16 of the standard at the lower forward corner thereof to form a detent which is engaged by a latch member 22 extending upwardly through an opening 23 in the base and pivoted to the lower side thereof by a pin 24. Latch 22 is urged into latching engagement with detent 21 by a leaf spring 25. The upper end of latch 22 may be provided with a finger piece 26 for rotating the latch clockwise out of latching engagement with detent 21. The rounded forward nose of the latch engages the rear corner of detent 21 to allow the detent to override the spring pressed latch as the standard is unfolded to its upright operating position.

The power unit comprises a generally cylindrical casing 27 enclosing an electric driving motor and the usual speed reduction gears located within its forward end. These gears are coupled to driving sockets for the conventional and readily detachable beater elements 28. The rear end 29 of the power unit has flat vertical sides 30, 30 which fit closely between the upper ends of legs 15 and 16 of the supporting standard. Projecting laterally from the sides 30, 30 and rigidly secured thereto are a pair of trunnion pins 31, 31 having large diameter heads on their outer ends. Projecting downwardly and rearwardly from the upper ends of the supporting standard legs are a pair of identical arcuate slots 32. The upper end of slots 32 are considerably wider than the diameter of trunnions 31 so that the trunnions may be readily and freely inserted into and withdrawn therefrom.

The rear end wall of the motor is generally cylindrical in shape and is provided with a series of transversely extending notches 33 which are selectively engageable with stop pins 34 projecting inwardly from the opposite rear corners at the upper end of supporting standard 14. As shown in the drawings, there are three sets of notches 33; hence, the motor can be adjusted to three different positions. As shown in Figure 1, stop pins 34 are seated in the lower set of notches and cooperate with trunnions 31 and slots 32 to support the motor in its normal horizontal operating position. Since the center of gravity of power unit 27 is approximately midway between its ends, it will be clear that the weight of the motor is counter-balanced by two forces one of which acts upwardly through trunnions 31 and the other of which acts downwardly through stops 34.

Figure 2:
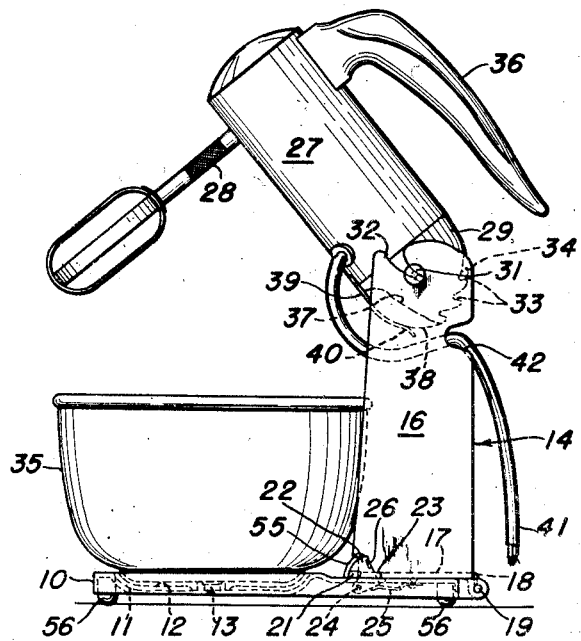
Figure 2 is a view similar to Figure 1 showing the power unit supported in one of its inclined non-operating positions.

If the operator wishes to remove the beaters from the mixing bowl 35 or to have freer access to the bowl, she simply pivots the motor to one of its inclined positions such as that illustrated in Figure 2. This is done by grasping the carrying handle 36 attached to the upper side of the power unit and tilting the motor upwardly and forwardly to the slight extent necessary for the protruding edges or lands between the notches 33 to by-pass stops 34. During this movement, trunnions 31 move forwardly and upwardly along slots 32 until the stops have by-passed one of the notch lands. As soon as the motor has been tilted upwardly to the desired position, the operator relaxes her grasp of the handle allowing the motor to slide downwardly and rearwardly in arcuate slots 32 until stops 34 are firmly seated in one of the notches 33.

If for any reason the operator wishes to perform a mixing operation at the stove and while supporting the power unit in her hand, she merely grasps handle 36 and lifts the power unit upwardly and forwardly through the open ends of slots 32. Note that it is unnecessary to operate any latches or coupling members or, in fact, to perform any operation except the upward and forward movement of the power unit with respect to supporting standard 14. After she has finished the mixing task, she may lay the power unit down on the table or reassemble it in standard 14. The latter operation is accomplished by holding the power unit in an inclined position as trunnions 31 are inserted into slots 32 until stops 34 engage with one of the desired notches 33.

The lower rear corners of the power unit are provided with outwardly facing arcuate channels 37 having open ends 38 to receive stops 34 when the power unit is pivoted downwardly between the legs of standard 14. The lower sides of channels 37 are formed by a curved metal plate 39 the opposite side edges of which are flush with sides 30, 30 of the motor. Plate 39 is rigidly secured to the rear ends of the motor and conforms in shape therewith as illustrated in the drawings. The rearmost edge 40 of this plate may be rounded as shown to facilitate the entry of stops 34 into the open rear ends 38 of channels 37. The purpose of channels 37 and plate 39 is to receive and engage behind stops 34 as the motor is folded for storage so as to prevent the motor and trunnions 31 from becoming disengaged from slots 32.

Figure 3:
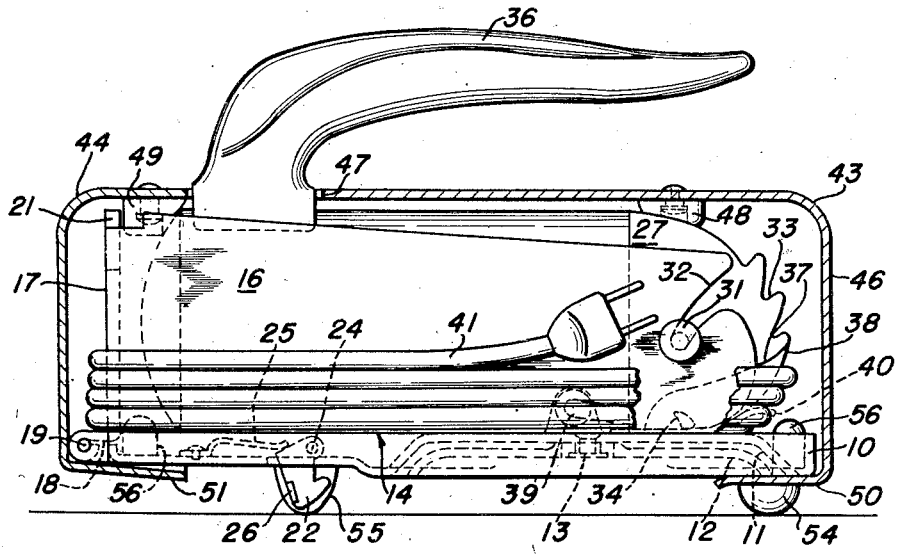
Figure 3 is a side view of the mixer in its folded storage position with the casing wall broken away for a better view of the parts when folded.

The folding of the mixer for storage is accomplished very quickly and simply in the following manner. First the operator tilts the motor to one of its inclined rest positions such as that shown in Figure 2. The mixing bowl is then removed from the base and the beater elements 28 are detached from their sockets in the motor. The operator then grasps handle 36 and tilts the motor upwardly and forwardly to disengage stops 34 from notches 33. Without allowing the rear end of the motor to reengage stops 34, the operator then pivots the forward end of the motor downwardly until it is fully nested between sides 15 and 16 of the supporting standard. As the motor rotates downwardly below the horizontal position, lip 40 on locking plate 39 engages stops 34 and guides them into the open ends of channels 37. The forward ends of channels 37 are preferably so located as to cause trunnions 31 to seat in the ends of the slots 32, as best illustrated in Figure 3. So long as the motor is nested within the hollow standard, it will be manifest that stops 34 cooperate with plate 39 to hold the power unit against displacement from slots 32.

Latch 22 is then disengaged from detent 21 and the standard is swung rearwardly about hinge 18, 20 until the rear edges of the standard lie flush against the bottom side of base 10. As this is taking place, the service cord 41 carried by the motor is swung into notch 42 in one side of the motor standard. The service cord is then wrapped about the standard in the area indicated in Figure 3.

Figure 4:
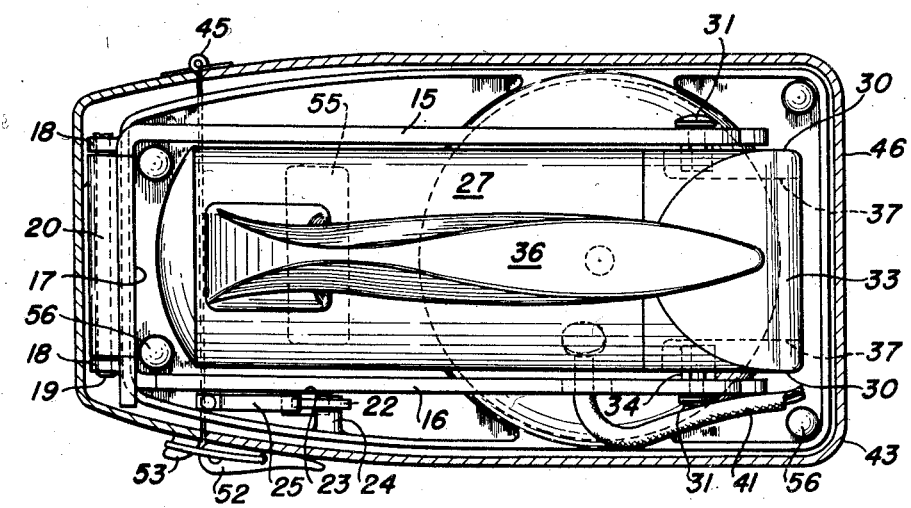
Figure 4 is a top plan view of the folded mixer with top wall of the casing cut away.

Preferably, the folded mixer is enclosed by a simple casing to protect it from dirt and to provide a neater appearance. A suitable casing is illustrated in Figures 3 and 4 and comprises a main body portion 43, an end cap 44 pivotally connected to the main casing by a hinge 45, and an integral rear end wall 46. This casing is closed except for its lower side and is shaped to closely embrace base 10 as well as the nested motor and its supporting standard.

The mixer is placed in the casing most conveniently by opening the end cap and upending the casing onto its rear end 46 so that the mixer can be inserted downwardly into the casing. Note that the upper forward corner of the main casing is notched at 47 to receive the base of handle 36. It will also be observed that the top inner surfaces of the main casing as well as of the end cap are provided with rubber bumpers 48 and 49 which engage the opposite ends of the power unit to prevent relative movement between the casing and the folded mixer. The top forward side of base 10 seats behind the inturned end 50 of the casing and cooperates with bumper 48 in holding the mixer snuggly in place within the casing. Likewise, the inturned lower edge 51 of cap 44 engages the upper rear corners of the mixer base and cooperate with bumper 49 in like manner to prevent movement of the mixer within the casing. The end cap is held in closed position by a single toggle clamp 52 carried on the side of the main casing opposite hinge 45 so as to engage a hooked detent 53 on the end cap in a well known manner to latch the end cap in closed position. As will readily be appreciated the entire unit may now be carried about from place to place by handle 36 which projects through the upper side of casing 43.

The collapsed unit is preferably supported by rubber feet one pair 54 of which extends downwardly from the inturned end 50 of the main casing. One or more additional rubber feet 55 may extend downwardly from the inturned lip of the end cap or, if preferred, they may be secured to the upper side of mixer base 10 at a point behind the turn-table. The latter location is shown in Figures 3 and 4. In this instance a single elongated rubber button 55 projects upwardly from the top side of the base. The forward edge of the base 17 of the motor standard 14 is cut away to make room for the foot when the standard is in its upright position. Hence when the mixer is folded for storage, foot 55 projects downwardly below the base and supports the mixer off the table surface so that end cap 44 may be freely opened or closed. It will also be observed that the lower corners of base 10 are provided with four rubber feet 56 which project below the base when the mixer is unfolded and serve to resiliently support the mixer off the table top.

To unfold the mixer, the operator unlatches toggle clamp 52, opens end cap 44 and then withdraws the mixer from the casing. Base 10 is then swung clockwise about hinge 18, 20 until latch 22 engages detent 21 on the standard and latches the latter in its upright operating position above the upper surface of the base. The concluding step is to grasp handle 36 and pivot the motor upwardly about its trunnions until stops 34 engage in the lowermost of notches 33. The beaters are then connected to their sockets and the mixing bowl is placed in position on turn-table 11. It will, of course, be understood that the motor is provided with the usual switch and with any suitable form of speed control.

Second embodiment

Figure 5:
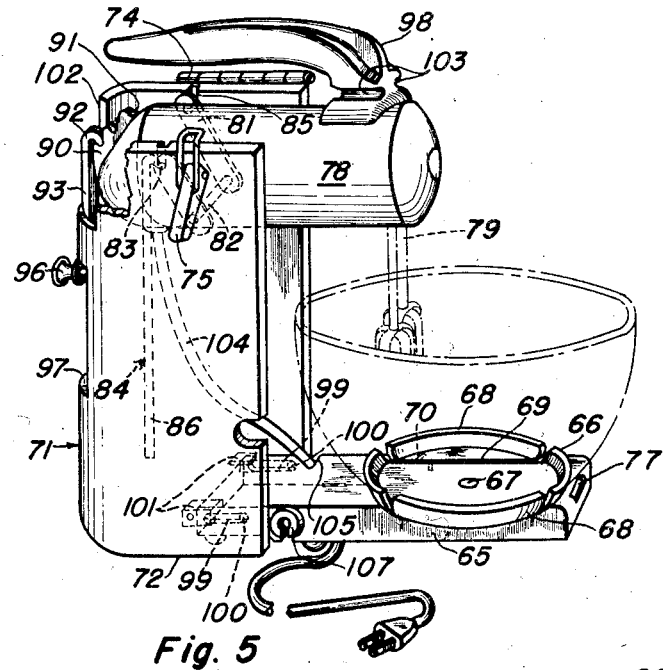
Figure 5 is a perspective view of another embodiment of the invention in which the supporting standard serves as the casing for the power unit.
Figure 6:
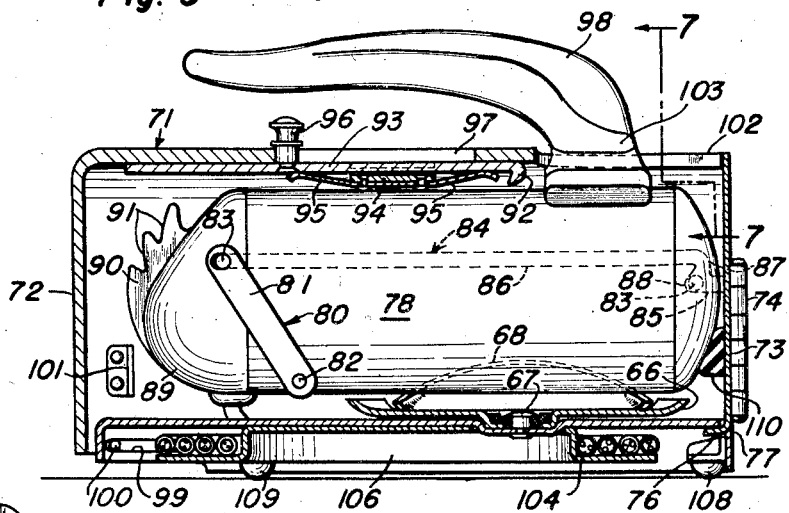
Figure 6 is a longitudinal sectional view showing the second embodiment folded for storage.
Figure 7:
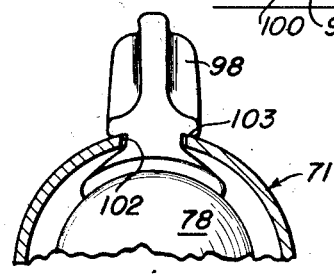
Figure 7 is a fragmentary view along line 7—7 on Figure 6 and showing the manner in which the handle and casing interlock when the mixer is collapsed.

One of the primary differences between the second embodiment illustrated in Figures 5 to 7 and that described above is that that the folding pedestal for the motor is shaped and arranged to provide a casing for the motor when the mixer is collapsed. Various other differences and unique features will be pointed out as the description proceeds.

The mixer base 65 comprises a sheet metal stamping of rectangular form having downturned rims of sufficient depth to provide an enclosure for a service cord storage facility, as will be referred to in greater detail presently. Rotatably supported on the upper forward surface of the base is a turn-table 66 pivotally connected to the base by a pin and bearing assembly 67. Note that the opposite sides 68 of the turn-table are pivotally connected to the main portion of the turn-table by hinges 69, 69. These hinges are so constructed that sides 68 cannot pivot downwardly below the horizontal position but can fold upwardly about the sides of the power unit when the mixer is collapsed for storage. The end corners of sections 68 are cut away sufficiently to permit these sections to fold without interference from the adjacent rim ends on the center section of the turn-table. Preferably hinges 69 are provided with light torsion springs 70 arranged to bias the sections 68 upwardly when the mixing bowl is not in place on the turn-table. However, hinges 69 may be constructed with sufficient friction to hold the side sections in any position in which they are placed so that springs 70 may be dispensed with.

The motor supporting pedestal generally indicated at 71 comprises a thin walled U-shaped housing having an open forward side slightly wider than base 65 so as to telescope thereover when the mixer is folded. The lower or base end 72 of standard 71 may be formed integrally with the standard while the opposite upper end can be closed by an end cap 73. Cover 73 for the top end of the pedestal is provided with a hinge 74 connected between one edge thereof and the corresponding upper edge of the side wall of the pedestal. When the mixer is in use this cover lies along the outer side of the casing. However, when the mixer is folded, cover 73 lies across the end of the pedestal and is held in closed position by a conventional toggle clamp 75. As will be observed from Figure 6, a lip 76 along the lower edge of cover 73 projects through an opening 77 in the forward rim of the base and interlocks therewith to hold the pedestal collapsed against the base.

The power unit 78 of the mixer comprises a cylindrical housing enclosing an electric motor, a speed control mechanism of any suitable form and speed reduction gears for driving a pair of beater elements 79. The internal details of the power unit need not be described since they do not constitute a feature of the invention and are well known in the prior art. The rear end of the power unit is pivotally coupled to the top of pedestal 71 by means of a U-shaped swinging cradle generally designated 80. This cradle comprises a pair of links 81 on the opposite sides of the motor having their lower ends rigidly connected to a rod 82 pivotally supported crosswise of the lower rear end of the power unit. Preferably cradle 80 is provided with stops along the side of the power unit or internally thereof which limit the pivotal movement of the cradle about pin 82 to a small arc of approximately 15° either side of the position shown in Figure 6. Projecting outwardly from the upper ends of links 81 are a pair of trunnion pins 83 positioned to extend into and slide along guideways 84 extending generally vertically along the opposite interior sides of pedestal 71. Guideways 84 are identical and each includes a short vertical section 85 opening through the upper end of the pedestal, a section 86 generally parallel to and slightly rearward of short section 85, and a short upwardly and rearwardly inclined section 87 connecting the adjacent ends of sections 85 and 86. The rounded sockets 88 provided at the junction of sections 85 and 87 serve as a supporting journal for trunnions 83 when the mixer is in its open operating position. The trunnions are, of course, freely slidable along all portions of the guideways.

The rear end 89 of the power unit is provided with an arcuate flange 90 having a series of upwardly opening notches 91 therealong which are selectively engageable with the hooked upper end 92 of a slide member 93 reciprocally supported along the inner rear wall of pedestal 71. Member 93 is held in place by a strap 94 secured to the inner wall of the housing. Leaf springs 95 frictionally engage slide 93 and serve to support it in any position to which it is moved. A control button 96 secured to slide 93 projects through a slot 97 in the rear wall of the pedestal. The ends of slot 97 cooperate with knob 96 to limit the travel of the slide. Note that the slide is located in the upper end of slot 97 in Figure 5 when the mixer is in its extended position. However, when the mixer is collapsed knob 96 is located at the lower end of slot 97, as indicated in Figure 6.

From the foregoing it will be obvious that the power unit 78 can be pivotably and adjustably supported cantilever fashion at the top of standard 71 by means of the U-shaped cradle 80 and the engagement of hook 92 with one of the notches 91. Assuming that hook 92 is seated in the lowermost notch 91, the motor will be rigidly supported in its normal horizontal operating position, as illustrated in Figure 5. So long as hook 92 remains seated in this notch, the motor may not be swung backwardly or forwardly in its cradle; nor may the motor pivot downwardly. However, the motor is free to pivot upwardly if the operator so desires. This is accomplished by grasping carrying handle 98 and tilting the motor upwardly about the axis of trunnions 83 and sockets 88. During this movement it is necessary for the motor to swing forwardly in cradle 80 so that the land portion of the next higher notch 91 may by-pass hook 92. As soon as hook 92 is opposite the intermediate notch, the operator may relax her grasp on the handle whereupon the weight of the motor will act to swing cradle 80 rearwardly causing hook 92 to seat in the intermediate notch 91.

If the operator wishes to use the power unit and beaters for mixing operations at the stove, she merely lifts the power unit upwardly by handle 98. In so doing, trunnions 83 move out through the open ends of guideway sections 85. Cradle 80, of course, remains attached to the motor unit but since its links 81 lie closely against the sides of the motor it does not interfere in any way with the use of the unit. After the mixing operation is completed, the operator simply returns the power unit to the pedestal by inserting trunnions 83 of the cradle into the open ends of guideways 85 and then swings the motor forwardly in the cradle sufficiently for hook 92 to engage one of notches 91.

The mixer base 65 is pivotally connected to the lower forward corner of pedestal 71 by a lost motion connection consisting of a pair of relatively short slots 99 located in the downturned rim of the base and a pair of pins 100 projecting through these slots from the inner opposite sides of the pedestal. Pins 100 are so located as to form a hinge connection between the base and pedestal when the pins are located in the rear ends of the slots. When the pedestal is in its upright position, as shown in Figure 5, base 65 may be slid rearwardly into the standard until pins 100 abut the forward ends of slots 99. The pedestal is then locked against downward pivotal movement toward the base by means of a pair of brackets 101 secured to the inner side walls of the standard so as to lie flush against the top rear corners of base 65.

The upper rear corner of the casing is notched at 102 to receive the supporting leg of the carrying handle 98. The opposite sides of the handle leg are preferably notched at 103 to receive the opposite facing edges of notch 102 of the casing as the mixer is collapsed for storage.

To collapse the mixer, the operator grasps handle 98 and tilts the motor upwardly so that beater elements 79 can be detached and slide member 93 can be moved to the lower end of slot 97. As the motor is held in a substantially vertical position, its lower end is maneuvered to move trunnions 83 upwardly and rearwardly into the upper ends of the long sections 86 of guideways 84. The motor unit may now be lowered vertically as the trunnions pass downwardly to the lower ends of the guideways. As the motor is lowered, the sides of casing notch 102 enter grooves 103 in the handle leg thereby preventing relative movement between the forward end of the motor and pedestal.

Base 65 is then pulled forwardly until pins 100 are seated in the rear ends of slots 99 after which it is pivoted upwardly as the opposite sides 68 of the turn-table fold against the sides of the power unit. Cover 73 is then swung upwardly across the open end of the pedestal and locked in place by toggle clamp 75. As the cover is closed, lip 76 enters opening 77 of the base and locks the base in place across the open forward side of the pedestal.

The storage cord 104 extends downwardly from the motor and through a notch 105 in the side of the base and is inserted through the open end of notch 105 in the side of the base as the base is swung to closed position. The free end of the service cord may then by wound into a coiled storage position provided on the lower side of base 65. This storage space is best illustrated in Figure 6 and comprises a centrally dished plate 106 secured to the bottom of the base. The periphery of this plate is spaced inwardly from the rims of the base sufficiently to permit the cord to be coiled into the space provided therefor by plate 106. The plug end of the cord may be secured in place beneath the base in any suitable manner. As here shown, the cord is frictionally retained by a rubber grommet 107 located in the side rim of the base.

The base may be supported by front and rear pairs of rubber feet 108, 109. Note that pair 109 is mounted on the rear end portion of the cord storage plate 106, as best shown in Figure 6. Cover 73 may be provided with a rubber bumper 110 positioned to engage the front end of motor 78 and hold it against endwise movement within the casing.

As was true of the first described embodiment, the present modification folds into an unusually compact space only slightly larger than that occupied by the power unit itself. Moreover, the carrying handle for the power unit serves as the carrying handle for the entire unit when it is collapsed within the hollow supporting pedestal.

The opening of the mixer to its operating position is accomplished as simply as was its folding. The operator first upends the encased mixer onto its rear end 72 and releases toggle clamp 75. The opening of the latter releases the base so that it can be pivoted downwardly about pins 100 and then shifted rearwardly beneath brackets 101 to lock the pedestal in its upright position.

The carrying handle 98 is then grasped and the power unit is lifted vertically until trunnions 83 enter the short passageways 87 and seat in sockets 88. The motor is then pivoted forwardly in cradle 80 and knob 96 is moved upwardly to bring the hooked end 92 of the slide member in position to engage one of the notches 91. The beater elements 79 are then inserted in their sockets and the mixer is ready for operation.

While only two modes of supporting the power unit by cantilever action have been specifically described, it will be obvious that various other structures and arrangements can be adopted without departing from the principles of the present invention. For example, the trunnion elements may be formed on the pedestal and engage downwardly facing arcuate flanges projecting from the rear sides of the power unit. In this event, the trunnions are stationary and the power unit is shifted lengthwise thereacross to engage or disengage the notches from the stops such as pins 34 in Figure 1 or hook 92 in Figure 5. Although it is not essential, compact storage objectives make it desirable to nest the power unit between the sides of the supporting standard or pedestal so that the unit can be collapsed as close as possible to one face of the base.

While I have shown and described but two embodiments of my invention, it is to be understood that these embodiments are to be taken as illustrative only and not in a limiting sense. I do not wish to be limited to the particular structure shown and described but to include all equivalent variations except as limited by the scope of the claims.

I claim:

1. In a foldable food mixer, a base, a hollow pedestal, the rear of said pedestal being formed with an opening, a portable self-contained power unit including driving means, said power unit having a carrying handle normally extending upwardly therefrom, means for pivotally and detachably supporting said power unit on the upper end of said pedestal in such manner that said power unit may be nested therewithin for storage with said handle projecting through said opening from the rear of said pedestal, means for movably connecting the lower end of said pedestal to the rear end of said base whereby said pedestal and power unit may be folded against said base with said handle projecting upwardly thereabove, and means for releasably locking said pedestal, power unit and base in folded position, said locking means comprising a casing interlocked with said base and enclosing said pedestal and power unit with said handle projecting through an opening formed in the upper side of said casing.

2. In a foldable food mixer, a base, a hollow pedestal, the rear of said pedestal being formed with an opening, a portable self-contained power unit including driving means, said power unit having a carrying handle normally extending upwardly therefrom, means for pivotally and detachably supporting said power unit on the upper end of said pedestal in such manner that said power unit may be nested therewithin for storage with said handle projecting through said opening from the rear of said pedestal, means for movably connecting the lower end of said pedestal to the rear end of said base whereby said pedestal and power unit may be folded against said base with said handle projecting upwardly thereabove, and means for releasably locking said pedestal, power unit and base in folded position, said pedestal forming an enclosing casing for said power unit with said handle projecting through an opening formed in the rear wall thereof and said locking means comprising a closure for the top end of said pedestal formed to interlock with said base.

3. In a food mixer, a base, a supporting standard, a slidable and pivotal joint between the rear end of said base and the lower end of said standard, said joint being so formed that the rear end of said base may be telescoped into and out of the lower end of said standard when said standard is in an upstanding position above said base, and means for holding said standard against pivotal movement relative to said base when the rear end of the latter is telescoped into the lower end of said standard and being releasable to permit pivotal movement of said standard downwardly against said base when the rear end of the latter is moved out of the lower end of said standard.

4. In a food mixer according to claim 3 in which said standard comprises side members spaced one on either side of said base, a power unit, a joint between the rear end of said power unit and the upper end of said standard for normally supporting said power unit in an operating position at the top of said standard, said joint being so constructed and arranged that said power unit may be moved between the side members of said standard and whereby said power unit may be folded against said base along with said standard for compact storage.

5. In a food mixer according to claim 3 including a carrying handle on said power unit, the arrangement being such that said handle projects rearwardly beyond the sides of said standard when said power unit is folded into said standard, and means for locking said standard and power unit against movement relative to said base when in folded position whereby the folded mixer may be carried about by said carrying handle.

6. In a food mixer according to claim 5 in which said locking means comprises an enclosing casing cooperating with said base to enclose said power unit with said handle projecting through an opening formed in a wall of said casing.

7. In a food mixer according to claim 5 in which said standard cooperates with said base to enclose said power unit with said handle projecting through an opening formed in the wall thereof and said locking means comprising a closure for the upper end of said standard which is formed to interlock with said base.

8. In a food mixer according to claim 3 including a turn-table rotatably mounted on said base forwardly of said standard, said turn-table being wider than said base and having diametrically disposed segments thereof hinged thereto whereby said segments may be folded upwardly beside the opposite walls of said power unit when said standard and power unit are folded against said base.

9. In a food mixer according to claim 3 in which said joint between said power unit and the upper end of said standard is a pivotal and slidable connection so constructed that said power unit may be pivoted upwardly and then telescoped downwardly between the opposite sides of said standard.

10. In a food mixer, a base, a hollow supporting standard secured to the rear end of said base, a self-contained power unit, and supporting means for supporting said power unit at the upper end of said standard for bodily swinging and sliding movement relative to said standard, said supporting means including means for supporting the power unit in a horizontally extending position overlying said base, and means carried by said power unit slidable relative to said standard arranged to permit sliding movement of said power unit downwardly into said hollow standard.

11. In a food mixer according to claim 10 in which said supporting means includes linkage means pivoted at its lower end to said power unit and pivoted at its upper end to said standard, and detent means on said standard co-acting with detent means on said power unit for normally holding said power unit and linkage means against movement relative to said standard, said co-acting detent means being disengageable by a forward and upward pivotal movement of said power unit with respect to said linkage means.

12. In a food mixer, a base, a supporting standard secured to the rear end of said base, linkage means having its upper end pivoted to the upper end of said standard, a power unit pivotally carried in one end of said linkage means whereby said power unit may pivot and swing bodily relative to said standard, and detent means on the rear upper corner of said standard co-acting with detent means on the rear end of said power unit for supporting said power unit in a stable operating position, said co-acting detent means being disengageable by a bodily forward and upward movement of said power unit relative to said standard so that said power unit can be collapsed to a non-operating position parallel to said standard.

13. In a food mixer according to claim 12 in which said power unit and linkage means are detachably connected to the upper end of said standard whereby said power unit and linkage means may be readily disconnected from said standard.

14. In a food mixer, a base, a supporting standard adjacent one end of said base, said standard including a pair of spaced vertically extending side walls, a vertically extending groove formed in the inner surface of each of said walls, said grooves terminating in laterally offset upwardly open recesses, a cradle having a pair of outwardly projected trunnions at one end thereof normally pivotally resting in said recesses and being slidable upwardly and downwardly in said grooves, a power unit pivotally supported in the other end of said cradle on said rod adjacent the rear end of said unit, a detent extending inwardly from said walls to the rear of said recesses, said detent being engageable in notches at the rear end of said power unit, the arrangement being such that said detent means and said notches may be disengaged from each other by a forward upward movement of said power unit and cradle to permit said power unit to be moved to a position between the walls of said standard by sliding trunnions along said grooves in the side walls of the standard.

15. A folding food mixer comprising a base, a motor supporting standard including upright members spaced to either side of said base, means pivotally connecting the lower end of said standard to the rear end of said base, an electric motor, means movably supporting said motor between the upper ends of the upright members of said standard and arranged to permit said motor to pivot about a horizontal axis extending transversely of said motor as well as to have limited translatory movement in a direction at right angles to said pivoting axis and axially of said motor, cooperating stop and detent means on said motor and standard for normally holding said motor against pivotal and translatory movement with respect to said standard, said stop and detent means being disengageable when the forward end of said motor is elevated and shifted axially thereof to permit said motor to fold to a collapsed position between said side members.

16. A folding food mixer as defined in claim 15 wherein said motor is provided with a handle extending along and above its upper side, and wherein said means for movably connecting said motor to said standard includes trunnions carried by said motor and a pair of slots in said standard opening through the peripheral edges of the standard whereby said motor and trunnions may be readily assembled on said standard or removed from the open ends of said slots for use independently of said base and supporting standard.

17. A folding food mixer as defined in claim 15 including a plurality of vertically spaced detents which are selectively engageable with said stop means and operable to support said motor in a horizontal normal mixing position above said base or in an inclined non-mixing position.

18. A food mixer as defined in claim 15 wherein said motor is provided with a handle on its upper side and wherein said means for movably connecting said motor to said standard includes trunnions projecting laterally from the rear sides of said motor, a pair of slots in said standard for receiving and journaling said trunnions and for permitting said trunnions to shift therealong as said motor is moved in a direction at right angles to the axis of said trunnions whereby said mixer is movable to a folded position by using said handle to disengage said stop and detent means and then folding the motor to a position between the side members of said standard and swinging the standard and base against one another about the pivotal means interconnecting the same.

19. A folding food mixer comprising, a base having a mixing bowl supporting area at its forward end, a power unit supporting standard having a pair of side members, means for movably connecting one end of said supporting standard to the rear end of said base, said side members being positioned adjacent either side of said base and normally occupying an upright position when said mixer is in its open operating position and being foldable against said base when it is desired to store said mixer, an electric power unit having its rear end movably supported between the upper ends of said side members and arranged to be supported therefrom in a stable operating position overlying said base when said mixer is open and to be nested between said side members when said mixer is folded for storage, a handle connected to the upper side of said power unit, means detachably connecting said power unit to said side members and arranged to permit said unit to be freely lifted therefrom by said handle when the mixer is in open position, and means operable to lock said power unit against detachment from said side members while the unit is nested between said legs for storage.

20. In a food mixer of the type comprising a base, an upright motor supporting standard projecting upwardly from one end of said base, a driving motor supported from the upper end of said standard having a front end projecting over said base, that improvement which comprises a gravity actuated coupling means connecting said motor to said standard, said coupling means being positioned rearward of the center of gravity of said motor and including cooperating fulcrum and stop means between said motor and said standard spaced at different distances from said center of gravity and with said fulcrum means being closer thereto than said stop means whereby the weight of said motor acts to hold the same coupled to said standard between said fulcrum and stop means and whereby said motor may be readily uncoupled from said standard by lifting the free forward end thereof upwardly and withdrawing the rear end from between said fulcrum and stop means.

21. In a food mixer as defined in claim 20 wherein said fulcrum and stop means includes a plurality of vertically spaced detents in which said motor is selectively engageable so as to be supported in different angular positions with respect to said standard and including one position in which said motor is supported generally horizontally above said base.

22. A folding food mixer comprising a base, a motor supporting standard having means pivotally connecting its lower end to the rear of said base, said standard having side members spaced to either side of said base, an elongated mixer motor having trunnion means projecting from the sides of its rear end portion, beater elements projecting downwardly from the front end of said motor, the side members of said standard having slots therein for receiving said trunnions and supporting said motor with its forward end overlying said base when in the operating position thereof, detent means at the rear end of said motor, stop means carried by said standard and engageable with said detent means to prevent said motor from pivoting downwardly about said trunnion means, said trunnion means and slots being arranged to permit said motor to move bodily in a direction at right angles to the axis of the trunnions as the motor is pivoted slightly about the trunnions to disengage said stop and detent means from one another to permit the motor to be folded into a nested position between the side members of the standard.

23. A folding food mixer as defined in claim 22 wherein said slots in the side members of the standard are open at their upper ends to permit said motor and the trunnion means thereon to be lifted out of said standard and used independently thereof.

24. A food mixer comprising a base having a standard projecting upwardly from the rear end thereof and having a cavity opening through the top end and one longitudinal face thereto, an elongated beater driving motor having its rear end movably coupled to the upper end of said standard by means comprising trunnion and slotted journal means interconnecting the rear sides of said motor and the adjacent portions of said standard, and cooperating stop and detent means between said standard and the rear portion of said motor and co-acting with said trunnion and slot means to support said motor in a normal operating position overlying said base or in a non-operating position with the longer axis of said motor housed within the cavity of said standard, said motor being movable from said operating to non-operating positions by a combined pivotal movement about the axis of said trunnions and a translatory movement crosswise of said axis to disengage said stop and detent means followed by further pivotal and translatory movement as said motor is moved into the cavity of said standard.

25. A food mixer having a base, a motor supporting standard secured to said base rearwardly of a mixing bowl supporting area of said base, said standard being open at least along one vertical face and the upper end thereof, an elongated electric motor, coupling means movably connecting the rear end of said motor to said standard comprising means providing a lost motion connection between the rear end of the motor and said standard and including means for confining the movement of said motor to a vertical plane passing through the longitudinal axis of said motor, said lost motion connection including a guideway and trunnions operating therein having an axis extending horizontally through the rear end of said motor and at right angles to the longitudinal axis of said motor, cooperating stop and detent means between said motor and standard offset from said trunnions and co-acting therewith to support said motor in an operating position overlying said base, said motor being movable to disengage said stop and detent means from one another by a combined pivotal movement of the motor about the axis of said trunnions and a translatory movement axially of said motor whereby said motor can be moved into the cavity in said standard, and a carrying handle on the upper side of said motor for holding the motor as it is moved between a non-operating position within said cavity and said operating position overlying said base.

26. A folding food mixer comprising, an upright hollow supporting standard, a base and a power unit pivotally connected to the opposite ends of said standard on axes extending crosswise of said power unit and of said base, the upper end and one vertical face of said standard being open, means for holding said power unit in an extended operating position overlying said base, means for holding said standard in an upright position near one end of said base, said power unit being movable to a folded non-operating position in which it is nested between the sides of said standard, said base being foldable against said open vertical face of said standard to form a closure therefor, a carrying handle on said power unit on the opposite side thereof from said base when the latter is folded against the standard, and means for locking said power unit folded against said base so that the folded mixer can be carried from place to place by said handle.

27. A folding food mixer having an elongated base, a turn-table for a mixing bowl at the forward end thereof, a supporting standard having interconnected spaced side walls open along their forward edges, means pivotally connecting the base end of said standard to the rear end of said base so that said base can be folded closely beside one pair of vertical edges of said standard, means for supporting said standard in an upright position with respect to said base, a power unit for driving beater elements, means providing a pivoting lost motion connection between the rear end of said power unit and the upper ends of said standard side walls and so arranged that said power unit can pivot through a vertical plane extending axially of said power unit as well as move bodily within said vertical plane, cooperating detent and notch means carried by the rear end of said power unit and the upper end of said standard for supporting said power unit in a substantially horizontal operating position overlying said base, said detent and notch means being disengageable by pivoting said power unit upwardly in said pivoting connection.

28. A food mixer comprising a base member, an upright hollow pedestal at the rear end thereof having a bifurcated upper end formed by the lateral sides of the pedestal, a beater driving power unit, means for supporting the rear end of said unit in the bifurcated end of said pedestal including means providing for both pivotal and translatory movement of said unit with respect to said pedestal, said pivotal movement being about an axis extending crosswise of the rear end of said unit and said translatory movement being lengthwise of said unit and at right angles to said pivotal axis, and stop and detent means on said unit and on said pedestal for selectively holding said unit in a plurality of stable supported positions, said stop and detent means being spaced from said pivotal axis and being disengageable by tilting the forward end of said power unit upwardly through a small angle and then shifting the same lengthwise of the unit whereupon said unit is free to pivot in either direction about said pivotal axis and whereby said unit can be held in a different stable position by a reverse translatory shift of said unit to reengage said stop and detent means.

29. A folding food mixer comprising an elongated base, a pedestal having its lower end pivotally connected to the rear portion of said base, said pedestal being hollow and open along its forward face and across its upper end, said pedestal being foldable against said base about said pivotal connection, an elongated power unit adapted to be housed within said hollow pedestal when not in use, movable coupling means between the rear end of said unit and the upper end of said pedestal for supporting said unit by cantilever action in an operating position overlying said base, said coupling means including a bodily shiftable pivoting axis extending transversely of said unit between the opposite sides of said pedestal as well as cooperating stop and detent means between said unit and said pedestal for holding said unit against movement lengthwise thereof and against downward pivotal movement toward said base when in said operating position, said unit being releasable for movement into said hollow pedestal by an upward tilting movement of said unit in combination with the lengthwise shifting thereof to disengage said stop and detent means.

30. A folding food mixer comprising an elongated base, a turn-table for a mixing bowl secured to the forward end of said base, a U-shaped motor supporting pedestal pivotally connected to the rear end of said base and having an open side facing the forward end of the base and an open upper end, a beater driving motor having a pivotal connection between its rear end and the upper end of said pedestal, means for releasably supporting said motor in a substantially horizontal operating position overlying said base and turn-table and for permitting said motor to be folded between the sides of said U-shaped pedestal for storage, a service cord connected to said motor, means on the underside of said base for receiving and storing said service cord when said motor and pedestal are folded into storage position against said base, and means for holding said mixer in folded position against said base.

References Cited in the file of this patent

UNITED STATES PATENTS

| | | |
|---|---|---|
| 1,166,753 | Finizio | Jan. 4, 1916 |
| 2,069,506 | Ross | Feb. 2, 1937 |
| 2,278,186 | Strauss et al. | Mar. 31, 1942 |
| 2,317,098 | Gough | Apr. 20, 1943 |
| 2,415,939 | Doner | Feb. 18, 1947 |
| 2,462,089 | Frisbie | Feb. 22, 1949 |
| 2,599,275 | Nelson | June 3, 1952 |